United States Patent
Bishop et al.

(10) Patent No.: US 8,150,001 B2
(45) Date of Patent: *Apr. 3, 2012

(54) METHODS FOR VOICE ACTIVATED DIALING

(75) Inventors: Michael Bishop, Atlanta, GA (US); Robert Koch, Norcross, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 1075 days.

This patent is subject to a terminal disclaimer.

(21) Appl. No.: 11/959,822

(22) Filed: Dec. 19, 2007

(65) Prior Publication Data

US 2008/0101555 A1 May 1, 2008

Related U.S. Application Data

(62) Division of application No. 10/731,307, filed on Dec. 9, 2003, now Pat. No. 7,356,131.

(51) Int. Cl.
*H04M 1/64* (2006.01)

(52) U.S. Cl. .................. 379/88.03; 704/246; 704/275

(58) Field of Classification Search ............... 379/88.03; 704/246–256, 275
See application file for complete search history.

(56) References Cited

U.S. PATENT DOCUMENTS

| | | |
|---|---|---|
| 5,165,095 A | 11/1992 | Borcherding |
| 5,204,894 A | 4/1993 | Darden |
| 5,835,570 A | 11/1998 | Wattenbarger |
| 5,924,070 A | 7/1999 | Ittycheriah et al. |
| 6,006,115 A | 12/1999 | Wingate |
| 6,163,596 A | 12/2000 | Gelfer et al. |
| 6,240,303 B1 | 5/2001 | Katzur |
| 6,370,237 B1 | 4/2002 | Schier |
| 6,404,876 B1 | 6/2002 | Smith et al. |
| 6,539,238 B1 * | 3/2003 | Brouns et al. ............. 455/558 |
| 6,665,377 B1 | 12/2003 | McKinley, Jr. et al. |
| 6,757,539 B2 * | 6/2004 | Kaibel et al. ............. 455/445 |
| 6,870,915 B2 | 3/2005 | Stillman et al. |
| 6,940,951 B2 | 9/2005 | Mahoney |
| 2004/0266418 A1 | 12/2004 | Kotzin |

* cited by examiner

*Primary Examiner* — Simon Sing
(74) *Attorney, Agent, or Firm* — Myers Bigel Sibley & Sajovec

(57) ABSTRACT

Methods for routing a call based on voice activated dialing (VAD). A VAD device module may respond to a VAD instruction, or to a call received with a VAD instruction with a corresponding call destination number obtained from a personal VAD directory. If the personal VAD directory fails to include the call destination number, the VAD device module may route the call or initiate a call through a gateway to a VAD network module. The VAD network module may obtain call destination information from the VAD instruction, and may use the call destination information obtain the call destination number. The VAD network module may obtain additional information from the call or other source, and use the additional information to obtain the call destination number. The call then is routed to the call destination number. The call destination number may be added to the personal VAD directory.

16 Claims, 2 Drawing Sheets

METHODS FOR VOICE ACTIVATED DIALING

CROSS-REFERENCE TO RELATED APPLICATIONS

The present application is a divisional application of, and claims priority to, U.S. patent application Ser. No. 10/731,307, filed Dec. 9, 2003 now U.S. Pat. No. 7,356,131, the disclosure of which is hereby incorporated herein by reference in its entirety as if set forth fully herein.

FIELD OF THE INVENTIONS

The inventions relate to communications, and particularly relate to the voice activated dialing (VAD) of communications.

BACKGROUND

Voice activated dialing (VAD) is a popular time-saving feature available on many communication devices. This feature enables a caller to simply speak an instruction such as "Call Michael" into his or her communications unit, and a call is placed to Michael's telephone number. Before the VAD feature may actually be used, however, the user typically must set up a personal VAD directory so that the VAD system is able to carry out the instructions from the caller. The personal VAD directory may include entries with each entry including an identity of a called party or entity and a corresponding telephone number. When the caller speaks the call instruction, the VAD system matches the name or phrase spoken by the caller to an identity in the caller's personal VAD directory, and the call is routed to the telephone number corresponding to the identity.

A problem with the VAD feature is that the extent of its use by a caller generally depends on the content of the caller's personal VAD directory. If a caller gives the VAD instruction of "Call Bob", and there is no match in the caller's personal VAD directory, then no VAD call can be made to Bob. Thus, a user who has spent a lot of time and effort inputting or having input many names and corresponding telephone numbers into his or her personal VAD directory has a lot of options in making VAD calls. A user who has only a few names and corresponding telephone numbers in his or her personal VAD directory is limited to making VAD calls to only those few people. But even a user who has a lot of entries in his or her personal VAD directory may desire or find a need to make a VAD call to a person or entity who is not included in the user's personal VAD directory. Without a name and corresponding telephone number in the caller's personal VAD directory, the caller may not take advantage of the convenience and speed of VAD calling.

For example, a mother who is stuck in traffic and running late to pick up her daughter from day care may desire to place a call from her car to the day care center to alert the personnel of her tardiness. Even if the mother has a thousand or more entries in her personal VAD directory, unless she has included the day care center and its corresponding telephone number in her personal VAD directory, she is unable to make a VAD call to the day care center.

Instead of making a VAD call, the mother must obtain the telephone number of the day care center from another source such as directory assistance. Some directory assistance systems give the user the option of having a call automatically placed to the requested telephone number. There may be a fee associated with this option. If the option is unavailable or the mother wants to avoid the fee, the mother must make a notation of or memorize the number provided by directory assistance. Only then can the mother place the call to the day care center. In sum, by failing to include the day care center and its telephone number in her personal VAD directory, the mother may have to carry out at least three steps in order to call the day care center: find the day care center's telephone number; note or memorize the telephone number; and call the telephone number. Taking these steps obviously takes up time and involves effort. The mother may not have the time nor be able to expend the effort while stuck in traffic to safely carry out these steps.

In sum, there is a need for a way for a caller having the VAD feature on his or her communications device to be able to make a VAD call to a person or entity not included in the caller's personal VAD directory.

SUMMARY

Stated generally, the inventions relate to methods and systems that allow for the voice activated dialing (VAD) of calls and other communications. Advantageously, the inventions solve problems of conventional VAD systems. The inventions are generally able to route a VAD call even when the directory number for the destination in the VAD instruction is not present in the personal VAD directory of the caller. The caller is saved from having to look up or otherwise obtain the directory number. The caller also is saved from having to dial the directory number. In addition, the caller is saved from having to make another call for either the directory number or to use the obtained directory number to reach the desired called party. A further advantage of the inventions is that the directory number obtained for the call may be added to the personal VAD directory of the caller. Thus, the inventions save a caller time and effort.

Particularly, the inventions include an exemplary method to route a call based on voice activated dialing (VAD). A call associated with a VAD instruction is received. Alternatively, a VAD instruction may be received, and a call created and routed based on the following described actions. The VAD instruction may include a call destination that does not have a match in a personal VAD directory associated with the device making the call. The call destination from the VAD instruction may be translated into data, and the data may be used to obtain a call destination number from another source such as a directory in a data network. Occasionally, additional call destination information may have to be obtained from the call and may be used to obtain the call destination number. The call then may be routed to the call destination number. Thus, the call may be completed to the caller's desired destination even though the VAD instruction provided by the caller did not include a match to a destination in the caller's personal VAD directory. An advantage of this exemplary method is that the call destination number that is obtained may be added to the personal VAD directory of the caller.

The inventions also include an exemplary system for voice activated dialing (VAD). The system includes a VAD device module that may be a part of the caller's device, or may be communicatively connected to or may reside in a voice communications network. The VAD device module responds to the failure of a personal VAD directory to provide a call destination number corresponding to a received VAD instruction. The VAD instruction may be received in association with a call. The VAD device module responds to the failure by routing the call through a gateway to a VAD network module.

The VAD network module may reside in or may be communicatively connected to a voice communications network and/or a data network. The VAD network module may use the VAD instruction or part thereof to obtain a call destination number from a directory, and to cause the call to be routed to the call destination number. To obtain the call destination number, the VAD network module may have to communicate with the call, the caller, or other person or entity to obtain additional information. Further, the VAD network module may update the VAD device module with the call destination number.

In sum, the inventions recognize and respond to a VAD instruction where the caller's personal VAD directory does not include a match to the destination received in the VAD instruction. The inventions facilitate the completion of the call per the VAD instruction by obtaining the destination number from a source other than the personal VAD directory of the caller. To obtain the correct destination number, the inventions may communicate with the call, caller, or other entity to obtain additional information. Further, the inventions may record or give the caller the option of recording the destination number and associated information in his or her personal directory.

The advantages of the inventions may be more clearly understood and appreciated from a review of the following detailed description and by reference to the appended drawings and claims.

DETAILED DESCRIPTION

The inventions allow a caller using voice activated dialing (VAD) to make a call even if the caller's personal VAD directory fails to include a directory number for the destination the caller desires to call. The inventions may detect the failure of the caller's personal VAD directory to include the appropriate information, and respond to that failure by obtaining the directory number from another source. The caller is saved from having to look up the directory number or to obtain the directory number from an information source such as "directory assistance" or otherwise. In addition, the caller is saved from having to dial the directory number because the inventions may cause the call to be created, and may cause the call to be routed to the directory number.

Advantageously, the inventions save the caller time and effort in making calls. Further, the inventions may include a feature that allows the obtained directory number to be included in the caller's personal VAD directory. The caller is saved from having to input such information, thereby saving additional time and effort.

Figure 1:
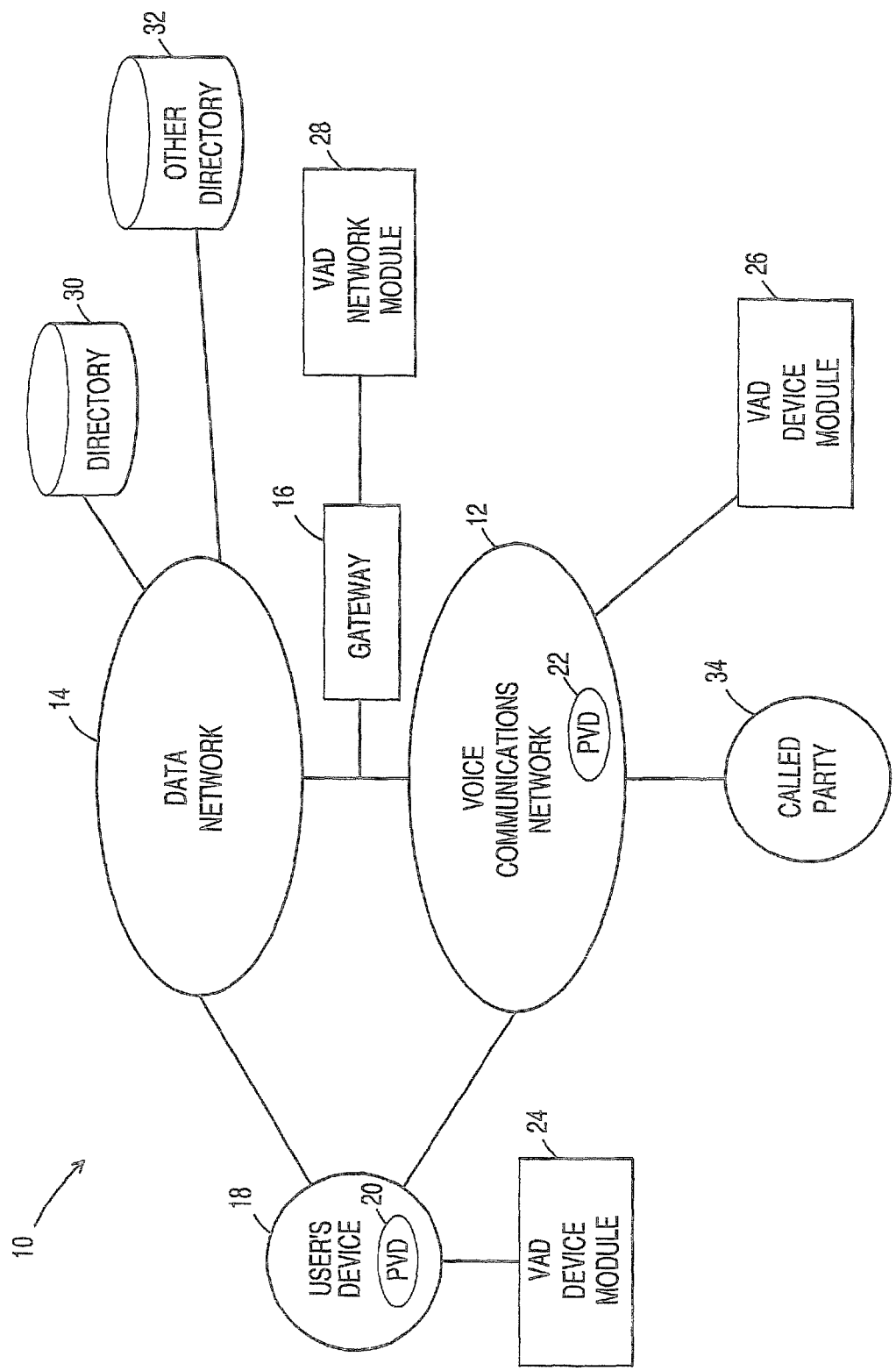
FIG. 1 illustrates an exemplary embodiment of the inventions in an exemplary environment.

FIG. 1—Exemplary Environment

FIG. 1 illustrates an exemplary environment 10 for implementation of an exemplary embodiment of the inventions. The environment 10 may include a voice communications network 12 connected to a data network 14. The voice communications network 12 may include, be part of, or be the public switched telephone network (PSTN), wireline network(s), and/or wireless network(s). The data network 14 may be a global data communications network such as the Internet and/or other network. Gateway 16 may be connected to, part of, may be connected between, and/or otherwise enable communications between the voice communications network 12 and the data network 14. As described below, the gateway 16 may include features and functions relating to the exchange of information between the voice communications network 12 and the data network 14, and/or other elements.

FIG. 1 illustrates a user's device 18 connected to the voice communications network 12 and to the data network 14. The illustration represents a user who may be using one or more devices for communications. A user also may be referred to as a caller, a calling party, a customer, or a subscriber. The illustration further represents that the one or more of the devices 18 may have a VAD feature, and that the one or more devices may communicate via the voice communications network 12 and/or the data network 14. The user's device may be referred to as a device, a unit, or a communications unit or otherwise. The device may be a telephone or other wireline unit, a wireless unit such as a mobile phone, a pager, a personal digital assistant (PDA), or a computer, or other communications instrument.

As noted in the background, if a user has a device with a VAD feature, prior to the user being able to make a VAD call, a personal VAD directory generally is set up by the user. The personal VAD directory may be associated with one or more devices of the user, or otherwise may be associated with the user. The personal VAD directory may include names for parties and/or destinations that may be called by the user, and corresponding telephone numbers associated with the names and/or destinations. The person or entity to whom a call is directed by the caller may be referred to as the called party, destination, call termination, or call destination.

In some cases, the personal VAD directory may reside in or be directly linked to the user's device such as illustrated in FIG. 1 by the personal VAD directory (PVD) 20 shown within the user's device 18. In other cases, the personal VAD directory may be stored in an element of the voice communications network 12 as shown in FIG. 1 by the personal VAD directory (PVD) 22 illustrated within the voice communications network 12. The personal VAD directory also may be stored in an element communicatively connected to the voice communications network 12 (example not illustrated in FIG. 1).

The personal VAD directory of a user may be communicatively linked to a VAD device module that includes functions relating to VAD instructions placed by the user and/or the routing of VAD calls placed by the user. For example, if the user's personal VAD directory resides in or is directly linked to his or her device 18, such as a personal VAD directory residing in the computer of a user, then an exemplary embodiment of the inventions provides for a VAD device module 24 to reside in or be directly linked to the device 18. Nonetheless, the VAD device module 24 need not necessarily also reside in the computer, but may simply be communicatively linked to the user's personal VAD directory 20. If the user's personal VAD directory resides elsewhere than the user's device 18, such as in an element of the voice communications network 12, then an exemplary embodiment of the inventions provides for the VAD device module 26 to be part of the voice communications network 12. The VAD device module 26 does not necessarily have to be a part of the voice communications network 26, but may be communicatively linked to the personal VAD directory 22.

Whether the VAD device module resides on the user's device 18, in an element of the voice communications network 12, or otherwise, in an exemplary embodiment of the inventions, the VAD device module monitors for failure of the user's personal VAD directory to find a directory number for a destination included in a VAD instruction. The VAD instructions may be provided by the user in association with a call. A call associated with a VAD instruction is referred to herein as a VAD call.

For example, assume a user makes a VAD call using device 18. A VAD call is a call initiated by the user providing a VAD instruction such as "Call Michael Bishop" to a receiver of the device 18 instead of dialing a directory number. In some cases, the VAD instruction may be provided by the caller, but no call is created by the user. Rather, the call to the destination in the VAD instruction may be initiated as a result of actions of the VAD device module 26.

A VAD instruction is a directive provided by the user to achieve the result of a communications function such as the calling of a particular party, destination, or entity. The VAD instruction may include a statement of the communications function to be carried out such as the "call" function, and may include information as to whom or what to call such as the name or other identification of the party to be called, which may be referred to herein as call destination information or destination information. As used herein, each of the terms "directory number", "directory listing", "call destination number" or "destination number" constitute an identifier for an address or other locator relating to a communications device of a called party. A directory number, call destination number, or destination number may refer to a telephone number, a line number, a called party number, a called number, or directory listing.

Further assume for illustrative purposes the user provides the VAD instruction of "Call Bob Koch", and the user's personal VAD directory fails to find a match to "Bob Koch". In an exemplary embodiment of the inventions, the VAD device module notes the failure and responds by routing the call through the voice communications network 12 via a gateway 16 to a VAD network module 28. In an alternative embodiment, where no call is initiated by the caller, the VAD device module may cause a call to be created and routed as described. As illustrated in FIG. 1, the VAD network module 28 is in a communicable relationship with the gateway 16. The VAD network module 28 may include telecommunications switch capabilities or other features to enable the VAD network module 28 to carry out the actions described herein.

More particularly, assume the personal VAD directory 20 of the user and the exemplary VAD device module 24 reside on or are otherwise in a communicable relationship with the user's device 18. When the user initiates a VAD call, a search is conducted for a match with respect to the destination information provided by the caller in the VAD instruction and the personal VAD directory 20. If there is no match, then the exemplary VAD device module 24 responds by routing the call or by causing the call to be routed through the voice communications network 12 to the gateway 16, and hence to the VAD network module 28. The VAD device module 24 may cause the routing of the call to the VAD network module 28 by providing an identifier such as an address or directory number assigned to the VAD network module 28.

Alternatively, the personal VAD directory 22 of the user and the exemplary VAD device module 26 may reside in or otherwise be in a communicable relationship with an element of the voice communications network 12. When the user initiates a VAD call, the call is received in the voice communications network and a search is conducted for a match with respect to the destination information provided by the caller in the VAD instruction and the personal VAD directory 26. In an alternative embodiment, where there is no call initiated by the caller, but a VAD instruction is received, the search may be conducted with respect to the destination information provided by the caller in the VAD instruction and the personal VAD directory 26. If there is no match, then the exemplary VAD device module 26 responds by routing the call or by causing a call to be routed to the gateway 16, and to the VAD device module 26. The VAD device module 24 may cause the routing of the call to the VAD network module 28 by providing an identifier such as an address or directory number assigned to the VAD network module 28.

As noted above, the call (where the user's personal VAD directory failed to find a match to destination information) (whether initiated by the caller or by the VAD device module) is routed through the gateway 16 to the VAD network module 28. The gateway 16 may be a voice/data gateway such as a VoiceXML Gateway (also referred to as a "voice browser" or VOXML). Further, the gateway 16 may be connected to the voice communications network 12 and the data network 14 through systems that include features or functionalities such as automatic speech recognition (ASR) and/or text-to-speech (TTS) (ASR/TTS). Thus, information associated with the call routed through the gateway 14 such as the VAD instruction ("Call Bob Koch") (also referred to as call destination information), or other information, may be translated into data for use by the VAD network module 28 in obtaining the call destination number.

Upon receipt of the call, the VAD network module 28 may extract information or data associated with the call and use that information or data to obtain the call destination number. In particular, the VAD network module 28 may obtain the call destination information associated with the VAD call and send the call destination information via the gateway 16 to the data network 14, and in particular, to a source of information such as a directory 30 or other directory 32 associated with the data network 14. The directory 30 or other directory 32 may use the call destination information to find a corresponding call destination number. Of course, the call destination information may be concurrently or serially provided to one or more other elements (such as databases, etc.) communicatively connected to the data network 14 for retrieval of a corresponding call destination number.

At some point, additional information relating to the call destination information may be required or desirable to obtain the corresponding call destination number. For example, upon receipt of the call, the VAD network module 28 may determine that information in addition to the destination information is needed to find the destination number. As another example, a directory or other element searching for the called destination number may request additional information of the VAD network module 28 for use in the search. Advantageously, the VAD network module 28 may communicate with the call to obtain the additional information. As explained above, the call is routed by a VAD device module through gateway 16 to the VAD network module 28. The VAD network module 28, therefore, may be linked to the caller and may quickly obtain additional information without having to launch a separate call or query.

For example, the name of the called party may not be enough to find a destination number because the called party's name may be relatively common. The VAD network module 28 may communicate with the caller to obtain geographical information from the VAD call so as to narrow the search for a match. The VAD network module 28 may provide the additional destination information to the directories or other elements searching for the corresponding call destination number.

The directory 30 or other directory 32 may be an information source such as a database or otherwise that includes information such as the names of parties or entities and their respective destination numbers.

In response to receipt of the destination information (and the additional information, if provided), the directory 30 looks for a corresponding destination number. The correspondence between the call destination information and the call destination number typically is a match of some identifying parts. Prior to looking for the match, or at other times, as noted above, the directory 30 may determine additional information is required. The directory 30 may communicate with the VAD network module 28 with respect to the additional destination information. The VAD network module 28 may obtain the additional information from the VAD call, and provide the additional destination information to the directory 30. One or more rounds of requests and supply of additional information may occur between the VAD network module 28 and the VAD call, and/or among the directory 30 (or other element), the VAD network module 28, and/or the VAD call.

In the example described in the previous paragraph, the VAD network module 28 transmits call destination information through gateway 16 to the data network 14 and to the directory 30 to obtain a call destination number. Advantageously, the VAD network module 28 may concurrently transmit the call destination information to more than one directory or source of information (such as to directory 30 and other directory 32, and/or other entity). Alternatively, the VAD network module 28 may consult the directory 30, other directory 32, and/or other entity in series such as in the case of a failure of a previously consulted source to find the corresponding call destination number, or to find the corresponding call destination within a preset time, or in other cases.

Upon finding the corresponding call destination number, the directory 30 (and/or other information source) via the data network 14 sends the corresponding destination number to the VAD network module 28. If the directory (and/or other information source) fails to find the corresponding call destination number, the VAD network module 28 may be informed of such failure.

As noted, the VAD network module 28 may send the destination information (and additional destination information) to a directory different from directory 30 for obtaining the call destination number. FIG. 1 illustrates that an example of such an "other directory" 32 may be accessed via the data network 14, but such another directory may be otherwise situated. The other directory may function similarly to the directory 30 in finding a destination number based on destination information (and additional destination information) provided by the VAD network module 28, and in returning the destination number to the VAD network module 28.

Once a destination number is provided to the VAD network module 28, it causes the VAD call to be routed to the destination number. In the example illustrated in FIG. 1, the VAD network module 28 causes the VAD call to be routed through the voice communications network 12 to the called party 34. By causing the VAD call to be routed to the destination number, the VAD network module 28 drops out of the communications link with the VAD call.

If no destination number is found corresponding to the called destination information, then in an exemplary embodiment, the VAD network module 28 routes the VAD call to an attendant (not illustrated) connected in the voice communications network 12. For example, the VAD network module 28 may cause the VAD call to be routed to a predefined default directory number. Upon connection, the caller may be informed of the failure to find the corresponding destination number and may be prompted for other information or given other options.

In the exemplary method described above, a VAD device module responds to a failure to find a call destination number in a personal VAD directory when a VAD call including call destination information is made or a VAD instruction is received. A response of the VAD device module is to cause the VAD call to be routed through the voice communications network 12 to the gateway 16 and to the VAD network module 28. Alternatively, if no call is received, the VAD device module may initiate a call. The VAD network module 28 takes action to obtain the call destination number from a source other than the personal VAD directory of the user. In an alternative embodiment, a VAD device module may be configured to respond to all calls in the way the VAD device module is described above as responding with respect to omissions in a personal VAD directory. A VAD device module may be configured to cause all VAD calls to be routed to the VAD network module, and/or all VAD instructions to result in a call that is initiated by the VAD device module and routed to the VAD network module. In other words, in the alternative embodiment, the need for a personal VAD directory may be obviated. For example, a caller places a VAD call or provides a VAD instruction; the VAD device module responds to the VAD call by routing it to the VAD network module and responds to the VAD instruction by initiating a call to the VAD network module; the VAD network module obtains the call destination number from a source through the data network; and the VAD network module causes the VAD call or the initiated call to be routed to the call destination number.

An advantage of the exemplary methods is that the destination number may be added to the personal VAD directory of the caller so that the caller does not have to spend the time nor make the effort of inputting the destination number and associating it with a called party. By adding the destination number and its associated information to the user's personal VAD directory, subsequent VAD calls to the called party having the destination number may be more efficiently and speedily routed. The destination number may be added to the personal VAD directory by the VAD device module.

In the exemplary embodiment, the destination number may be added to the user's personal VAD directory automatically and associated with the appropriate destination information based on the information received as part of the VAD instructions.

Figure 2:
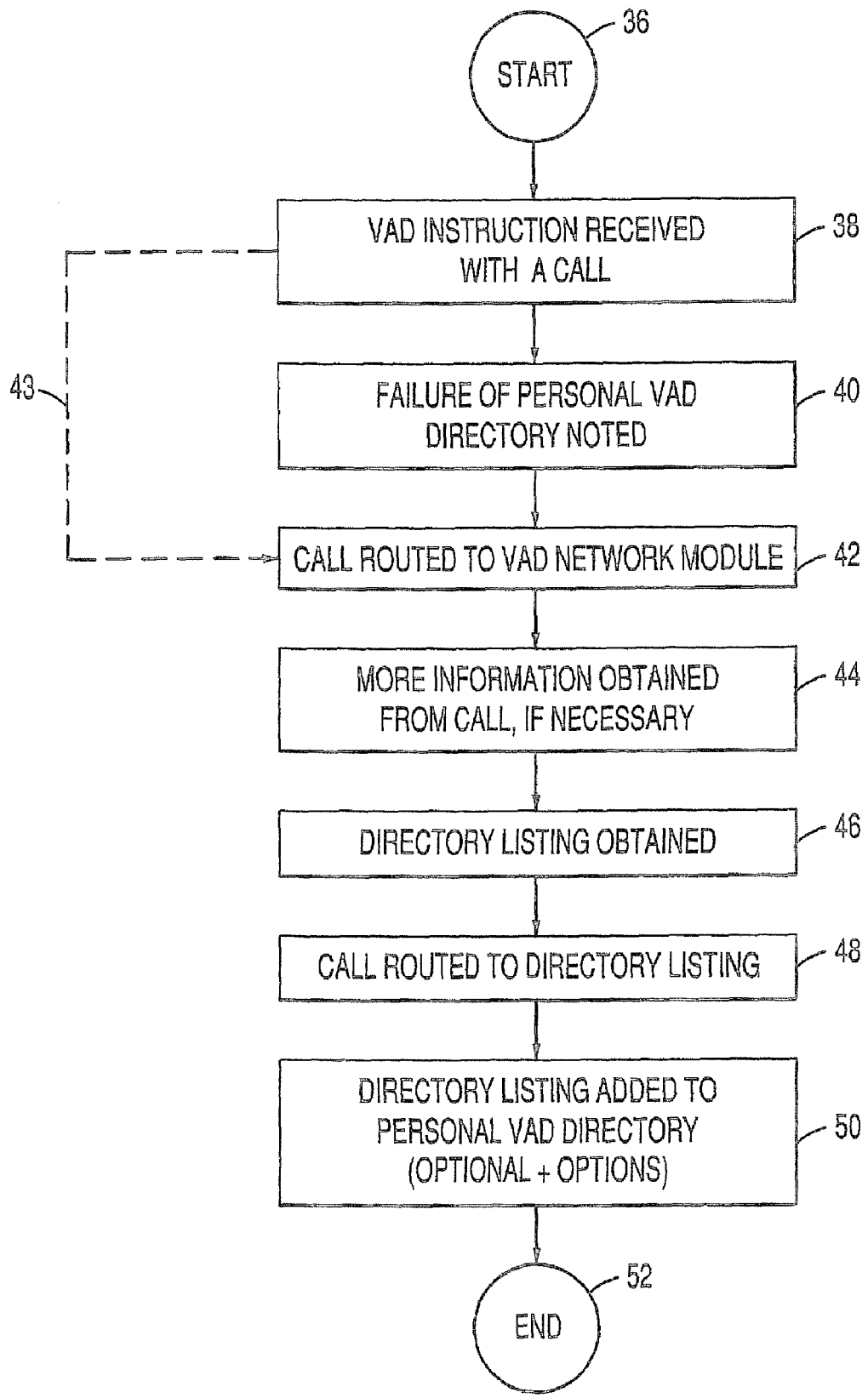
FIG. 2 is a flow diagram illustrating some actions of an exemplary method of the inventions.

FIG. 2—Actions of an Exemplary Embodiment

FIG. 2 is a flow diagram summarizing actions of an exemplary method of the inventions. After start 36, a VAD call is received in action 38. A VAD call also may be referred to as a call that has an associated VAD instruction. Alternatively, a VAD instruction (rather than a VAD call) may be received. In action 40, the exemplary method notes the failure of the personal VAD directory of the user to provide a destination number for the called party identified in the VAD instruction. In response to the failure, the VAD call is routed to a VAD network module in action 42. Alternatively, where no call is received, a call may be initiated and routed to the VAD network module.

As indicated by dashed arrow 43, an alternative method may respond to the receipt of a VAD call or VAD instruction in action 38 by routing the VAD call or initiating a call to the VAD network module as illustrated in action 42. In other words, in the alternative embodiment, the action 40 of noting the failure of the personal VAD directory to include a call destination number is not a condition to the action of routing or initiating the call to the VAD network module.

After routing of the VAD call or the initiated call to the VAD network module, if necessary or desirable, in action 44, more information relating to the VAD call may be obtained. The more information may include additional or alternative destination information relating to the called party or destination. The destination information and, if appropriate, more information may be provided to a directory (or other information source) so as to obtain, in action 46, the directory information (also referred to as the "directory listing") relating to the called party identified in the VAD call or in the VAD instruction. In action 48, the VAD call is routed to the directory number.

Action 50 of FIG. 2 illustrates an optional action(s) and options relating to the addition of the obtained directory listing and associated information to the personal VAD directory. For example, the directory listing and corresponding destination information may be automatically added to the user's personal VAD directory. The exemplary method ends in action 52.

From the foregoing description of the exemplary embodiments of the inventions and operation thereof, other embodiments will suggest themselves to those skilled in the art. Therefore, the scope of the inventions is to be limited only by the claims below and equivalents thereof.

We claim:

1. A method for routing a call based on voice activated dialing, comprising:
   receiving, into a voice activated dialing device module located in a customer premises, a call initiated by a voice activated dialing instruction in a user device;
   failing to find a call destination number corresponding to the voice activated dialing instruction in a first directory in the user device;
   translating at least a part of the voice activated dialing instruction into data in response to failing to find the call destination number corresponding to the voice activated dialing instruction in the first directory in the user device;
   using the data to obtain the call destination number from a second directory, comprising:
      obtaining additional information from the call;
      translating the additional information into additional data; and
      using the data and the additional data to obtain the call destination number from the second directory; and
   routing the call to the call destination number.

2. The method of claim 1, further comprising:
   adding the call destination number to the first directory.

3. The method of claim 1, wherein the call is received in a voice communications network;
   wherein the second directory is part of a data network;
   wherein using the data to obtain the call destination comprises communicating with the second directory in the data network; and
   wherein the call is routed in the voice communications network to the destination number.

4. A method for voice activated dialing of a call, comprising:
   receiving, in a voice activated dialing call that is initiated by a voice activated dialing initiated instruction in a user device, a voice activated dialing instruction with call destination information;
   failing to find a call destination number corresponding to the call destination information in a first directory in the user device;
   translating the call destination information into data in response to failing to find the call destination number corresponding to the call destination information in the first directory in the user device
   routing the call to a gateway that is communicatively connected to a voice activated dialing network module; and
   using the data to obtain the call destination number.

5. The method of claim 4, further comprising:
   routing the call to the call destination number.

6. The method of claim 4, further comprising:
   initiating a call to the call destination number.

7. The method of claim 4, further comprising:
   determining a call path between origination of the voice activated dialing instruction and the call destination number.

8. The method of claim 7, further comprising:
   causing a call to be routed along the call path.

9. The method of claim 4, wherein the voice activated dialing instruction is received in a voice communications network;
   wherein the data is used to obtain the call destination number from an element in a data network; and
   further comprising:
   routing a call in the voice communications network to the destination number.

10. The method of claim 4, wherein the directory comprises a first directory; and
    wherein using the data to obtain the call destination number comprises using the data to obtain the call destination number from a second directory.

11. The method of claim 4, wherein using the data to obtain the call destination number comprises obtaining additional information, and using the additional information to obtain the call destination number.

12. The method of claim 4, further comprising:
    adding the call destination number to the first directory.

13. A method for voice activated dialing of a call, comprising:
    receiving, into a voice activated dialing device module located in a customer premises, a voice activated dialing instruction corresponding to a call;
    causing, after failing to find a call destination number, the call to be routed to a voice activated dialing network module that is communicatively coupled to the voice activated dialing device module via a gateway;
    using, in the voice activated dialing network module, at least part of the voice activated dialing instruction to obtain the call destination number from a directory; and
    causing the call to be routed to the call destination number.

14. The method of claim 13, wherein the gateway comprises a voice and data gateway.

15. The method of claim 13, further comprising:
    obtaining additional information at the voice activated dialing network module; and
    obtaining the call destination number from the directory via the additional information.

16. The method of claim 13, further comprising updating the voice activated dialing device module with the call destination number via the voice activated dialing network module.

* * * * *